United States Patent
Numata

(10) Patent No.: US 9,942,301 B2
(45) Date of Patent: Apr. 10, 2018

(54) INFORMATION PROCESSING TERMINAL AND METHOD

(71) Applicant: CANON KABUSHIKI KAISHA, Tokyo (JP)

(72) Inventor: Masahito Numata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 207 days.

(21) Appl. No.: 14/739,346

(22) Filed: Jun. 15, 2015

(65) Prior Publication Data

US 2015/0373141 A1    Dec. 24, 2015

(30) Foreign Application Priority Data

Jun. 18, 2014  (JP) ................. 2014-125736

(51) Int. Cl.
*G06F 15/16* (2006.01)
*H04L 29/08* (2006.01)
*H04W 4/18* (2009.01)

(52) U.S. Cl.
CPC ............. *H04L 67/02* (2013.01); *H04L 67/04* (2013.01); *H04L 67/289* (2013.01); *H04L 67/2842* (2013.01); *H04W 4/18* (2013.01)

(58) Field of Classification Search
CPC .......... H04N 5/44543; H04N 21/4782; H04N 21/6543; G06F 17/30899; H04L 67/02
See application file for complete search history.

(56) References Cited

U.S. PATENT DOCUMENTS

| | | | | |
|---|---|---|---|---|
| 8,874,730 B1* | 10/2014 | Eisinger | ............ | G06F 17/30899 709/224 |
| 9,582,603 B1* | 2/2017 | Acharya | ............ | G06F 17/30902 |
| 2002/0078102 A1* | 6/2002 | Dutta | ................ | G06F 17/30893 715/205 |
| 2009/0106769 A1* | 4/2009 | Nakamura | .......... | G06F 9/44521 719/311 |
| 2013/0238742 A1* | 9/2013 | Kay | ..................... | G06F 9/5016 709/213 |
| 2013/0311286 A1* | 11/2013 | Detwiler | ............ | G06Q 30/0255 705/14.54 |
| 2014/0025949 A1* | 1/2014 | Kay | .................... | H04L 63/0428 713/168 |

FOREIGN PATENT DOCUMENTS

JP        2009-070373 A        4/2009

* cited by examiner

*Primary Examiner* — Tauqir Hussain
*Assistant Examiner* — Kamran Mohammadi
(74) *Attorney, Agent, or Firm* — Canon USA, Inc. I.P. Division

(57) ABSTRACT

An information processing terminal displays a confirmation screen for confirming whether to delete data relating to a web site, in a case where a movement from the web site on a web browser is detected, and if deleting is confirmed via the confirmation screen, the information processing terminal deletes data saved for the web site to release an area secured for the web site.

11 Claims, 14 Drawing Sheets

FIG. 6

| WEB SITE | ALLOCATION CAPACITY | USED CAPACITY | PERMISSION STATE |
|---|---|---|---|
| http://aaa.com | 1 GB | 500 MB | TEMPORARY PERMISSION |
| http://bbb.com | 1 GB | 420 MB | PERSISTENT PERMISSION |
| http://ccc.com | 100 MB | 25 MB | PERSISTENT PERMISSION |

FIG. 10

SETTING OF NOTIFICATION ABOUT DELETION FROM FILESYSTEM

CONFIRM USER WHETHER TO RETAIN FILE IN FILESYSTEM IN FOLLOWING CASES

☑ NOTIFY ONLY WHEN USED CAPACITY IS LARGE ~1001
☑ NOTIFY ONLY WHEN ALLOCATION CAPACITY IS LARGE ~1002
☑ DO NOT NOTIFY WHEN SITE IS EXCEPTIONAL SITE ~1003

☑ http://aaa.com
☐ http://bbb.com
☐ http://ccc.com

1005~ Delete    Add ~1004

Cancel    OK ~1006

INFORMATION PROCESSING TERMINAL AND METHOD

BACKGROUND OF THE INVENTION

Field of the Invention

The present invention relates to a technology for use in a web browser in which a data storage mechanism in a web browser supporting Hyper Text Markup Language (HTML) 5 is implemented.

Description of the Related Art

As the function of a web application highly improved, various functions are extended in HTML5. An example of the extended functions is the FileSystem Application Programming Interface (API) function for operating a FileSystem in a storage area of a web browser. The FileSystem API function allows a user to handle a large file of, for example, a document, a moving image, and a game. In addition to the FileSystem API function, an application cache function for caching a file on a web server and a WebStorage function and an IndexedDataBase (IndexedDB) function for storing data in a storage area for a web browser are available. In addition, a mechanism for managing a state of connection (online/offline) between an information processing terminal, on which a web browser operates, and a network is provided to allow a web application to reference the state and to notify a web application of a change in the state.

These extended functions enable a personal computer (PC) and a mobile terminal, which browse a web application (web site), to use a service available on the web site by using a file or data stored in a storage area for the web browser, even when the PC and the mobile terminal are offline.

On the other hand, there is a conventional technology for caching contents provided by a web site, to a storage area of a web browser. In addition, some web browsers provide a Graphical User Interface (GUI) for allowing the user to delete cached data.

As a method for deleting unnecessary cached data, there is a conventional technology discussed in Japanese Patent Application Laid-Open No. 2009-70373. The technology discussed in Japanese Patent Application Laid-Open No. 2009-70373 is that a web application is registered in an image formation apparatus, a required file is cached when the web application is used, and the related cache is deleted when the registration of the web application is deleted.

Because the extended functions described above allow a very large file to be saved in a storage area for a web browser as compared with a cache of a conventional web browser, there is an issue that a large amount of storage capacity of the terminal is used for that file. In the technology discussed in Japanese Patent Application Laid-Open No. 2009-70373, when a user deletes a web application, it can be easily determined that the web application is not necessary and, therefore, there is no problem if the related cache data is deleted. However, the operation to browse or close a web site on a web browser is significantly different from the operation to register or delete (installation or uninstallation) of a web application. That is, just because of the operation performed to close a web site via a web browser or to terminate a web browser, it cannot be determined whether the web site will not be used in the future. This means that the technology discussed in Japanese Patent Application Laid-Open No. 2009-70373 does not solve the above issue caused by the extended functions described above.

SUMMARY OF THE INVENTION

According to an aspect of the present invention, an information processing terminal on which a web browser operates, the web browser having a function to save data relating to a web site into a storage area for the web browser, the information processing terminal including a first control unit configured to control display of a first confirmation screen, the first confirmation screen being for confirming whether to permit securing of an area of a particular size for saving data therein, according to a request from the web site, a saving unit configured to secure, in a case where permitting is confirmed via the first confirmation screen, the area of the particular size using a FileSystem Application Programming Interface (API) supported by the web browser and save the data relating to the web site into the secured area, a detection unit configured to detect a movement from the web site on the web browser, a second control unit configured to control, in a case where a movement from the web site is detected, display of a second confirmation screen for confirming whether to delete the data relating to the web site, and a deletion unit configured to delete, in a case where deleting is confirmed via the second confirmation screen, data saved for the web site and release the secured area for the web site.

Further features of the present invention will become apparent from the following description of exemplary embodiments with reference to the attached drawings.

BRIEF DESCRIPTION OF THE DRAWINGS

FIG. 6 is a diagram illustrating an example of a data structure for managing permission states of applications.

FIG. 10 is a diagram illustrating an example of a setting screen of deletion notification.

DESCRIPTION OF THE EMBODIMENTS

Exemplary embodiments of the present invention are described below with reference to the drawings.

Figure 1:
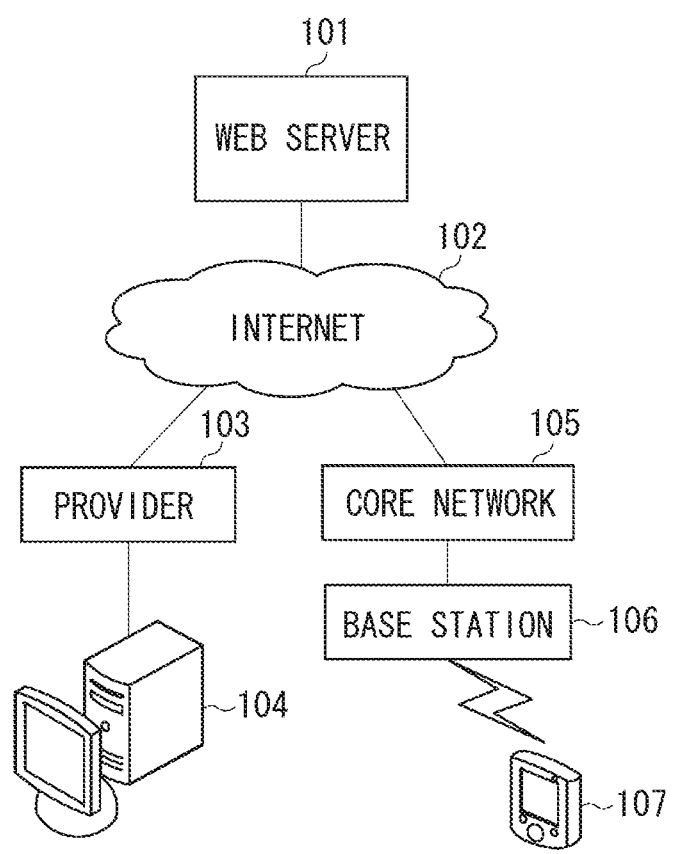
FIG. 1 is a diagram illustrating an example of a configuration of a network system of the present invention.

FIG. 1 is a diagram illustrating an example of a configuration of a network of the present invention.

An information processing device 104 is a PC that communicates with a provider 103 through an optical line and connects to the Internet 102 via the provider 103. An information processing terminal 107, such as a tablet and a smartphone, is a terminal that wirelessly communicates with a base station 106 and connects to the Internet 102 via a core network 105. A web server 101 is a system that provides a web site to the information processing devices via the Internet 102.

A smartphone, a tablet, a digital camera, a car navigation system, and a notebook PC may be used as the information processing terminal 107.

Figure 2:
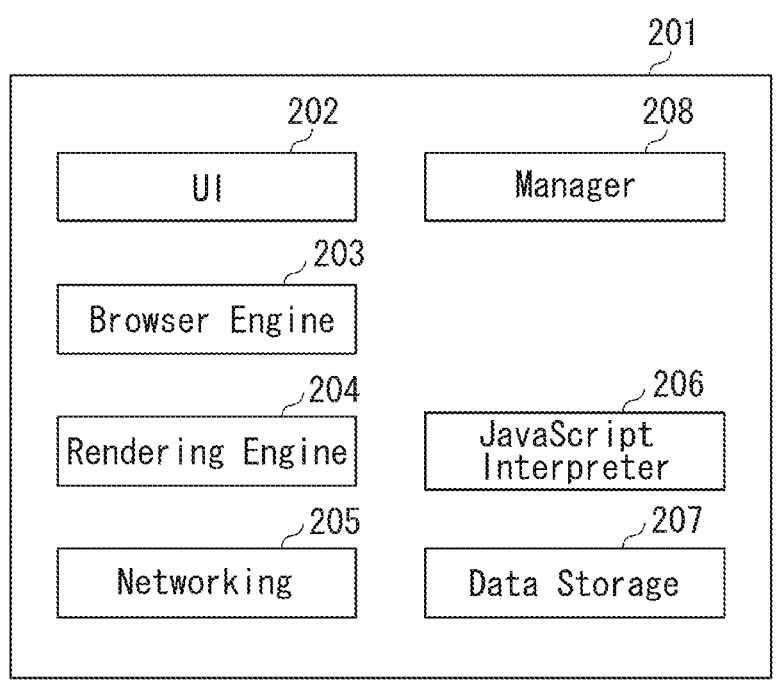
FIG. 2 is a block diagram illustrating an example of a configuration of a web browser.

FIG. 2 is a block diagram illustrating a general configuration of a web browser 201 that implements the present invention.

A user interface (UI) 202 is a web browser UI that includes a uniform resource locator (URL) display, a bookmark display, and a web browser setting menu display. A rendering engine 204 displays contents requested by coding in a page description language, such as HTML. A browser engine 203 performs processing between the UI 202 and the rendering engine 204. A networking 205 accepts a network call, such as a Hypertext Transfer Protocol (HTTP) request. A JavaScript (registered trademark) interpreter (hereinafter called a JS interpreter) 206 interprets and executes JavaScript (registered trademark) code. A data storage 207 saves data of cookies, HTML5 FileSystem, application cache, WebStorage, and IndexedDB into a hard disk drive (HDD) 308 (described below) or a storage device 416 (described later). The operation to save data to or delete data from the data storage 207 can be controlled by using JavaScript (registered trademark). A manager 208 manages a function of managing a state according to a user instruction provided via a confirmation screen, which will be described later, and a function of detecting a movement to or from a web site.

The blocks illustrated in FIG. 2 each correspond to a module for implementing processing that is the characteristic feature of the present invention. These modules are implemented by programs of a web browser or by a program for extending the web browser. A program for extending a web browser can be downloaded as necessary from a web site, such as an application store operated by a vendor of the web browser.

Specification of FileSystem API is described.

A web application requests a user to allocate a required disk capacity by using the FileSystem API, to save a file in a storage area for a web browser. After the required disk capacity is allocated, the application can write and read a file to and from the allocated capacity using the FileSystem API.

When requesting the user to allocate a disk capacity, the application can specify one of the following two storage types.

Temporary Type

When a disk capacity is allocated, the user does not need to give permission to the application. When a free storage capacity becomes insufficient, the web browser can delete a file without an instruction from the user or the application.

Persistent Type

When a disk capacity is allocated, the user must give permission to the application. An application, with the same origin as that of the application that has obtained permission, can handle a file in the storage area of the web site within the allocated capacity without obtaining permission thereafter. The web browser cannot delete a file without an instruction from the user or the application.

Figure 3:
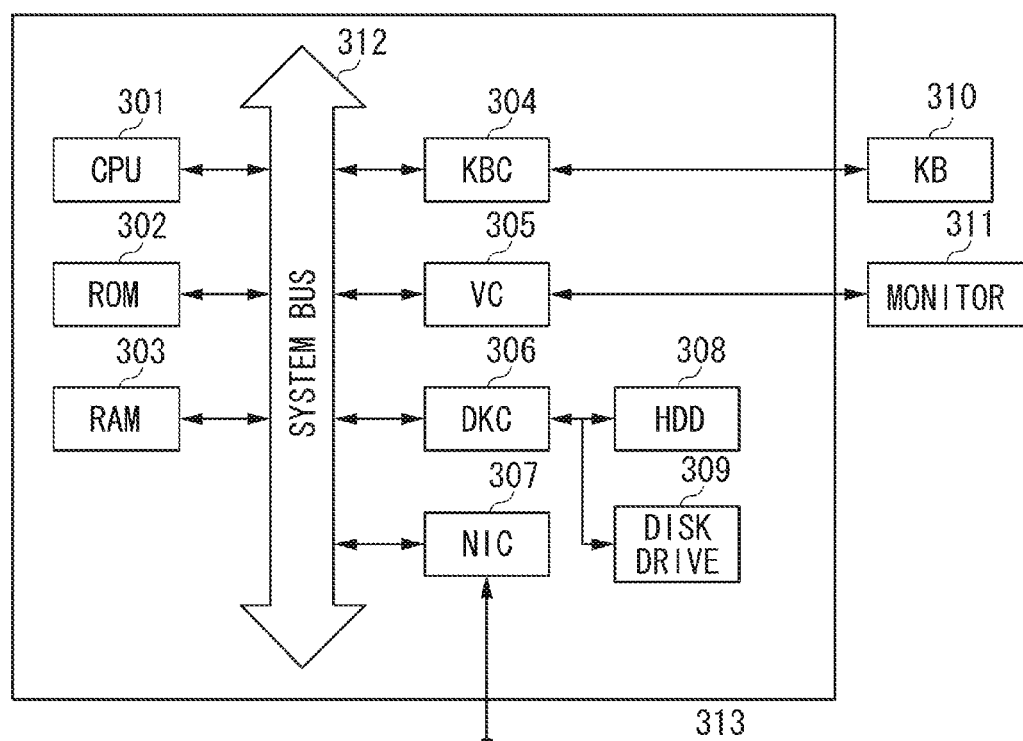
FIG. 3 is a diagram illustrating a hardware configuration of an information processing device.

FIG. 3 is a block diagram illustrating a hardware configuration of the information processing device 104.

The central processing unit (CPU) 301 executes the programs stored in a read-only memory (ROM) 302 and the HDD 308 that is a storage device, using a random access memory (RAM) 303 as the work memory, to control the configurations, which will be described later, via a system bus 312. The HDD 308 stores the operating system (OS), various types of programs, and data. The CPU 301 accesses the HDD 308 and a disk drive 309 via a disk controller (DKC) 306 to install various types of programs onto the HDD 308. The CPU 301 can also communicate with other computers through a network 313 via a network interface card (NIC) 307.

The CPU 301 displays an UI on a monitor 311 via a video card (VC) 305 according to the program. The user provides an instruction and performs input to the UI by operating a keyboard (KB) 310 and a pointing device, such as a mouse. The CPU 301 accepts a user instruction and input via a keyboard controller (KBC) 304 and performs various types of processing according to the user instruction and the input.

Figure 4:
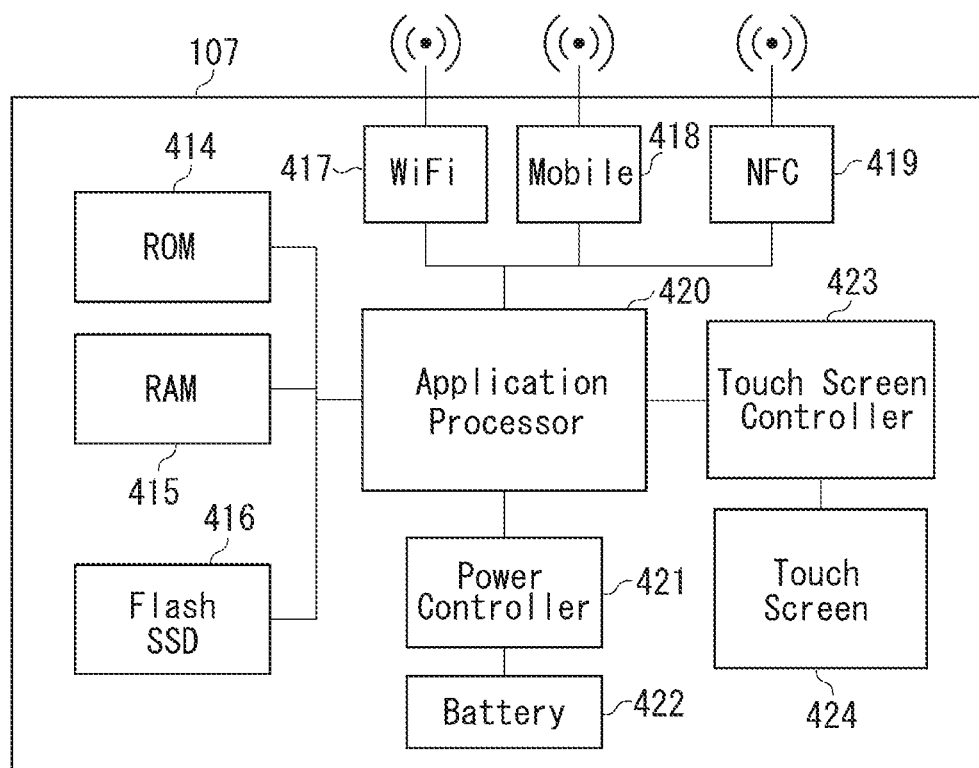
FIG. 4 is a diagram illustrating a hardware configuration of an information processing terminal.

FIG. 4 is a block diagram illustrating a hardware configuration of the information processing terminal 107 on which the web browser 201 according to the first exemplary embodiment operates.

Referring to FIG. 4, the information processing terminal 107 includes an application processor (hereinafter called an AP) 420, a ROM 414, a RAM 415, and the storage device 416 configured, for example, by a flash solid state drive (SSD). The AP 420 executes software stored in the ROM 414 and the storage device 416, and integrally controls the devices connected to the AP 420. The RAM 415 functions as a main memory or a work area of the AP 420. The storage device 416 is configured by a flash memory and the like. The storage device 416 stores an operating system, various applications of, for example, a web browser, database data, or user files. In addition, the information processing terminal 107 includes a touch screen controller 423 that controls a touch screen 424 connected to the controller. In addition, the information processing terminal 107 includes a wireless local area network (LAN) controller 417, a mobile communication controller 418, and a near field wireless communication controller 419. These controllers control wireless LAN communication (such as Wireless Fidelity (WiFi)), mobile communication, and near field wireless communication, respectively. The information processing terminal 107 also includes a power controller 421 that controls charging to a rechargeable battery 422 and manages the battery level.

The configuration of the information processing terminal 107 illustrated in FIG. 4 is an example to which the present invention is applicable. Therefore, the present invention is applicable also to the information processing terminal 107 that further includes hardware components not shown in the figure, such as a hardware component for providing a network connection function or a hardware component, such as a camera. The present invention is applicable also to a configuration in which any of the components, such as the near field wireless communication controller 419, is not included. In addition, the present invention is applicable when a web browser operates on an apparatus with a hardware configuration similar to that shown in FIG. 3.

Figure 5:
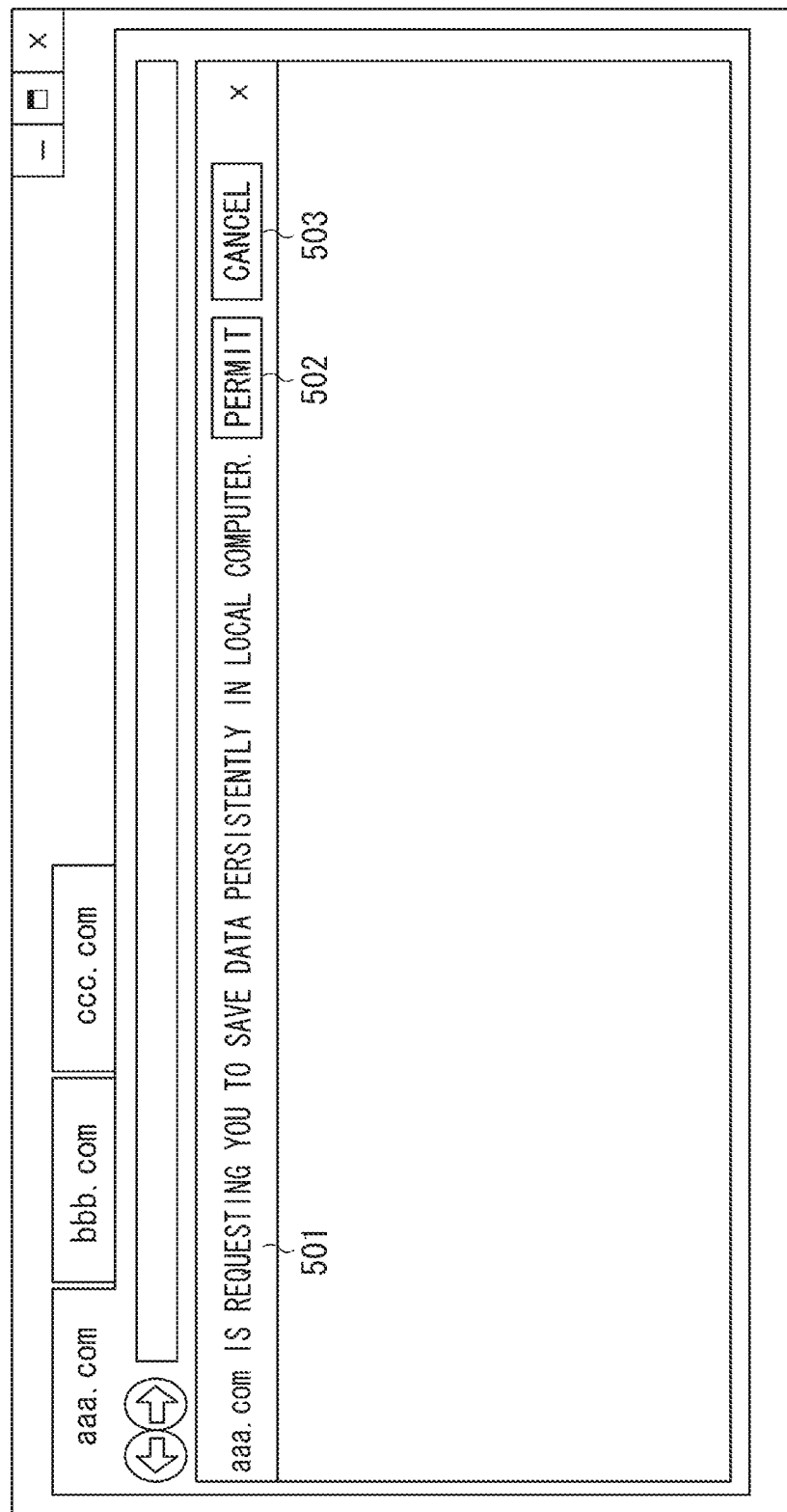
FIG. 5 is a diagram illustrating an example of a confirmation screen on which permission to save data is requested.

FIG. 5 is a diagram illustrating an example of a confirmation screen for the user displayed on the web browser.

This screen is displayed when a web application requests the user to allocate a disk capacity in a persistent type storage area of the browser.

In a message display portion 501, a message is displayed indicating that a request to write into a persistent area is received from a web application. The display message may include the disk capacity requested by the application. The display message may be changed according to the size of the requested disk capacity. A permit button 502 is used by the user to permit a disk capacity allocation request received from the application. A cancel button 503 is used by the user to reject a disk capacity allocation request received from the application.

Although saving data in persistent type storage requires user permission, a general user may not even know that data to be downloaded is a different type of data from a conventional cache. In some cases, a general user cannot understand what data a web application will write using the FileSystem API, nor does the user understand why the web application will write data. When permission is requested by a web application as illustrated in FIG. 5 and to correctly determine whether to permit a request, the user is required to have adequate information technology (IT) skill sets or knowledge about the application.

FIG. 6 is a diagram illustrating an example of a data structure managed by a web browser. This data structure manages a permission state of each application for persistent type storage areas. In this data structure, a web site indicating a web application corresponding to the permission is added as a row when the user permits a request on the confirmation screen illustrated in FIG. 5.

A web site 601 identifies a permitted web site and manages the permitted web site on an origin basis. An origin refers to a combination of a protocol, a host name, and a port of the web site. An allocation capacity 602 indicates a disk capacity requested by an application. A used capacity 603 indicates a capacity used by the application. A permission state 604 manages permission states that will be described later with reference to FIG. 7.

Figure 7:
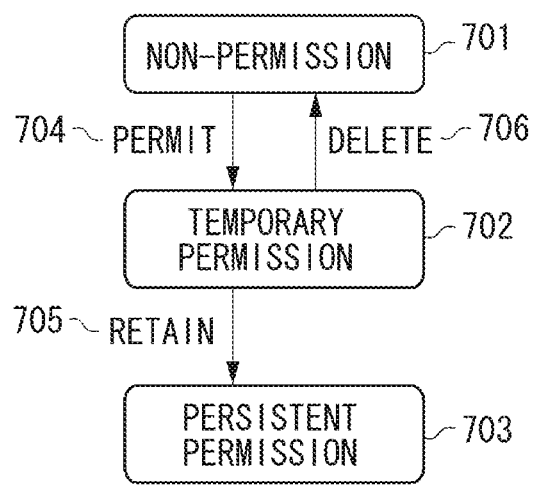
FIG. 7 is a diagram illustrating state transition of a permission state of an application according to a first exemplary embodiment.

FIG. 7 is a diagram illustrating state transition of a permission state when a web application saves data in a persistent type storage area.

Figure 8:
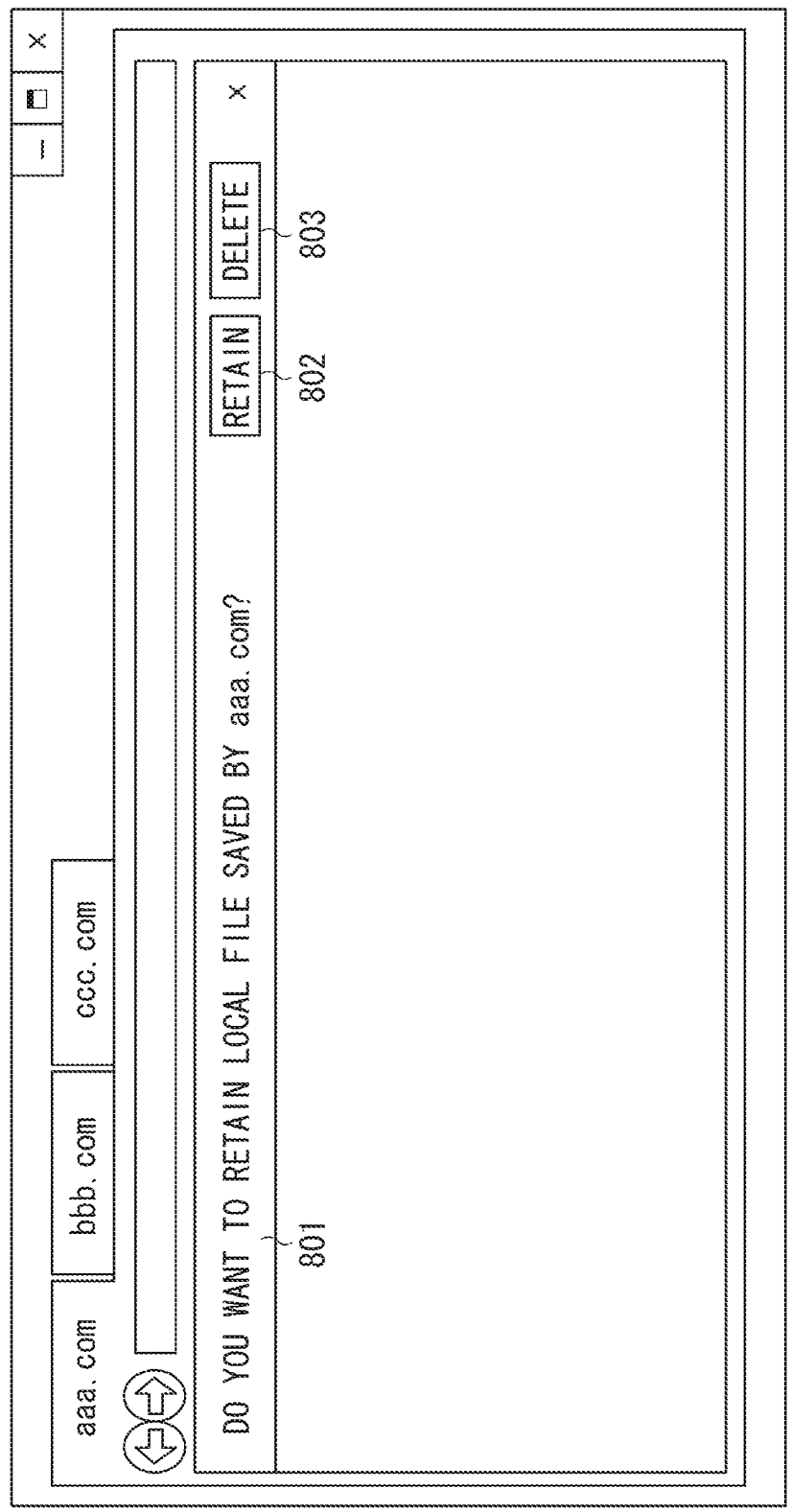
FIG. 8 is a diagram illustrating an example of a confirmation screen for deleting data according to the first exemplary embodiment.

A non-permission state 701 indicates an initial state in which an application is not permitted file access to the persistent type storage area by the user. When the permit button 502 is pressed by the user on the confirmation screen illustrated in FIG. 5, the permission state of the application changes to a temporary permission state 702 via a transition "permit" 704. When the application is in the temporary permission state and the user moves to another web site, a confirmation screen, which will be described below with reference to FIG. 8, is displayed. The permission state of the application changes to a persistent permission state 703 via the transition "retain" 705 which is for following the instruction provided via the confirmation screen illustrated in FIG. 8. On the other hand, in a case where an instruction to delete is provided via the confirmation screen illustrated in FIG. 8, the used capacity 603 of the persistent type storage area that has been used temporarily by the web application is deleted. In addition, the allocation permission of the disk capacity is deleted, and the permission state of the application changes to the non-permission state 701 via a transition "delete" 706. In this manner, data saved by the web site, as well as a setting of allocation capacity which is to be usable for saving by the web site, is deleted. That is, the area that has been secured for the web site is released.

In general, the specification of the FileSystem API defines that a state of an application becomes the persistent permission state 703 according to permission from the user, and after that, the application can handle (write) a file without obtaining permission from the user within the disk capacity allocated at the permission. In this case, it should be noted that once permission is given, the file is not deleted until the user or the application explicitly provides a deletion instruction. Therefore, when the user casually visits a web site, uses the application at that web site only once, and after that, does not access the web site, the user loses a chance to delete data relating to the web site by the application. Even if the user tries to delete the data relating to the web site, it is unlikely that the user memorizes in detail a web site casually visited. Therefore, in many cases, it is very difficult to properly delete data by specifying data managed on an origin basis.

To address this problem, when data is saved using the File System API, the present invention provides the temporary permission state 702 before the persistent permission state 703. In the temporary permission state 702, the present invention provides a user a chance to delete data as necessary, whereby whether data is to be saved or deleted is controlled by prompting the user to determine appropriately.

FIG. 8 is a diagram illustrating an example of a confirmation screen for confirming the user whether to delete data saved by a web application via the data storage 207. This screen is displayed on the web browser when the user provides an instruction to move from a web site in the temporary permission state illustrated in FIG. 7. Moving from a web site refers to an operation to specify a uniform resource locator (URL) of a site different from the web site currently browsed, to close a tab of the web site currently browsed by the web browser, or to close the web browser.

In a message display portion 801, a message is displayed indicating whether the data saved by the web application is to be deleted. One or more of the used capacity 603 and the allocation capacity 602 of the application may be displayed in the display message. A retain button 802 is used by the user to provide an instruction for retaining the data saved by the application. When the retain button 802 is pressed, the permission state of the application changes to the persistent permission state 703 in the permission state illustrated in FIG. 7. It is supposed that the determination to retain data after the user uses the application is more correct than the determination performed before the user uses the application. A delete button 803 is used by the user to provide an instruction to delete data saved by the application. When the delete button 803 is pressed, the used capacity 603 of the persistent type area used by the application is deleted and, in addition, a setting of the allocation capacity 602 is deleted. The permission state of the application changes to the non-permission state 701 in the permission state illustrated in FIG. 7.

Alternatively, when the delete button 803 is pressed, only the used capacity 603 but not the setting of the allocation capacity 602 may be deleted. Further, the user may be allowed to select whether to delete not only the used capacity 603 but also the setting of the allocation capacity 602.

When the delete button 803 is pressed, at least a part of data saved as other than the persistent type in association with the web site to the memory area for the web browser may be deleted along with persistent type data. The data saved as other than persistent type data includes temporary type data, a cookie, an application cache, WebStorage data, and IndexedDB data. Furthermore, the user may be allowed to select data to be deleted with persistent type data from among pieces of data saved as other than the persistent type.

Figure 9:
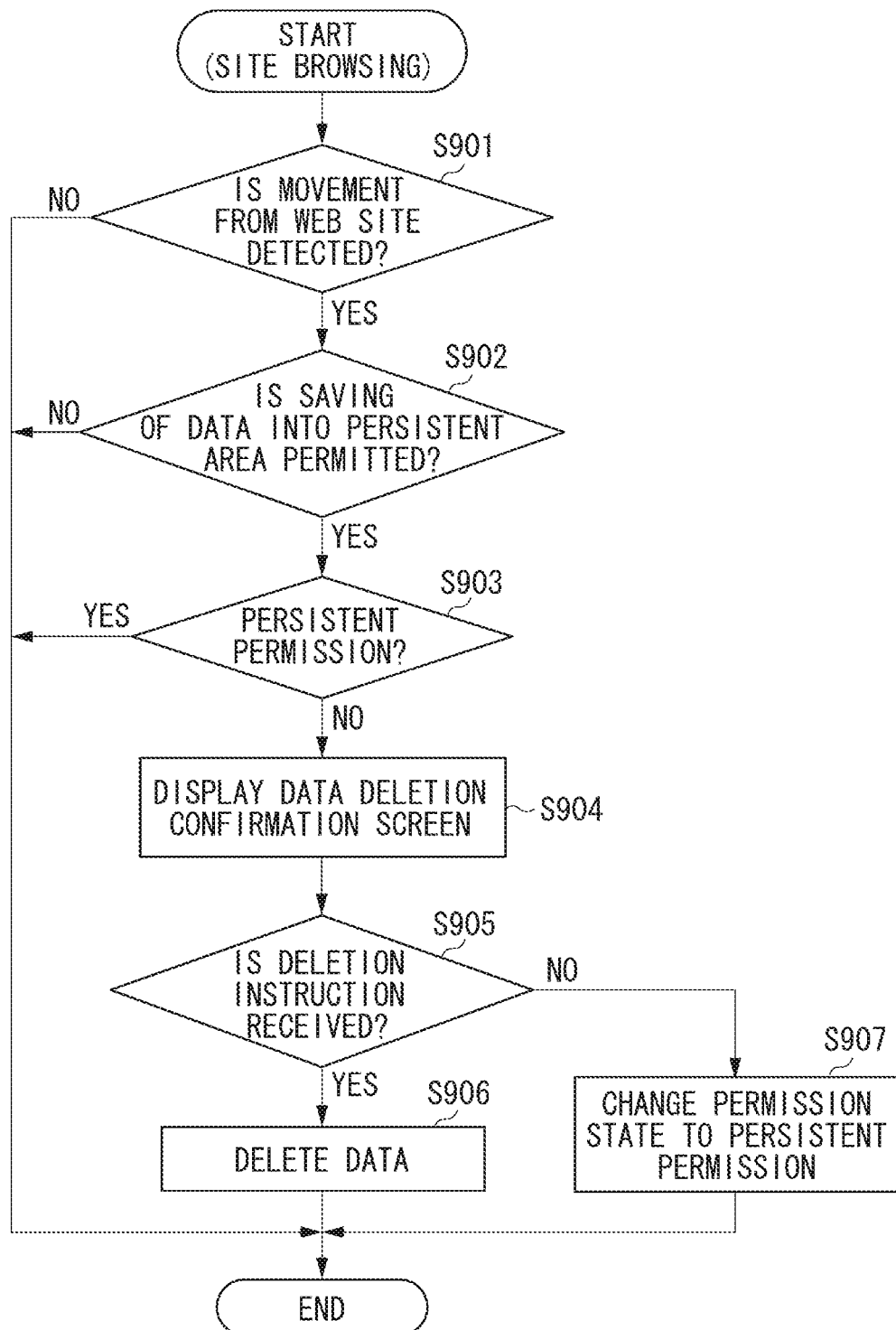
FIG. 9 is a flowchart illustrating processing in which a web browser displays the confirmation screen.

FIG. 9 is a flowchart illustrating processing in which the web browser 201 displays the confirmation screen illustrated in FIG. 8. The processing described below is implemented by the AP 420 of the information processing terminal 107 that executes the web browser program or a program for extending the web browser.

In step S901, the manager 208 detects that the user has provided an instruction to move from the currently browsing web site. Examples of the instruction to move from one web site to another include specifying a URL of a site different from the web site the user currently browsing, closing the tab of the web browser, or closing the web browser.

In step S902, the manager 208 references the information illustrated in FIG. 6 to confirm whether the web site being browsed is permitted to write data to the persistent type storage area. In a case where the web site being browsed is permitted to write data into the persistent type storage area (YES in step S902), the processing proceeds to step S903. In a case where the web site being browsed is not at all permitted to write data into the persistent storage area (NO in step S902), the manager 208 terminates the processing. In step S903, the manager 208 confirms whether the permission state for the web site is the temporary permission state 702 or the persistent permission state 703. In a case where the permission state is the persistent permission state 703 (YES in step S903), the processing is terminated. In a case where the permission state is not the persistent permission state 703 but the temporary permission state 702 (NO in step S903), the processing proceeds to step S904.

In step S904, the UI 202 displays the confirmation screen illustrated in FIG. 8. In step S905, the manager 208 determines whether the user has pressed the delete button 803 to provide a deletion instruction. In a case where the deletion instruction is provided (YES in step S905), the processing proceeds to step S906. On the other hand, in a case where the user has pressed the retain button 802 to provide a retention instruction (NO in step S905), the processing proceeds to step S907.

In step S906, the manager 208 requests the data storage 207 to delete the data corresponding to the used capacity 603 of the web site. In addition, the manager 208 deletes the setting of the allocation capacity 602 corresponding to the web site illustrated in FIG. 6. In this case, the manager 208 may also delete a record of the web site that has been in the temporary permission state as illustrated in FIG. 6.

In step S907, the manager 208 updates the record corresponding to the web site, in the table illustrated in FIG. 6, in such a way that the permission state of the web site is changed from the temporary permission state 702 to the persistent permission state 703.

In this processing, an example of a case in which it is determined that the permission state is not the persistent permission state 703 in step S903 (temporary permission state 702) is a case in which the user presses the permit button 502 for the web site which is visited by the user for the first time when the screen illustrated in FIG. 5 is displayed, and after that, the user provides an instruction to move from that web site to another web site. With the processing according to the present exemplary embodiment, the user can provide an instruction of whether to save the data required by the application, after the user experiences the web application once.

According to the present exemplary embodiment, the processing in step S902 and the subsequent steps is executed at a timing of when moving from a web site is detected. However, the timing of when the processing in step S902 and the subsequent steps is executed is not limited to the timing according to the present exemplary embodiment. For example, the processing in step S902 and the subsequent steps may be executed at a timing of when the manager 208 detects deletion of a web site from a bookmark or a history of the web browser or at a timing of when the manager 208 detects a web site, which has not been accessed for a predetermined time, by a regular inspection. More specifically, upon detecting an instruction from the user to delete a particular web site from the bookmark of the web browser, the manager 208 performs the processing in step S902 and the subsequent steps for the web site to be deleted.

FIG. 10 is a diagram illustrating an example of a screen for a setting of notification about deletion of saved data according to the FileSystem. For example, this screen is started from a setting menu (not illustrated) provided by the web browser 201. According to setting information of this screen, when the manager 208 displays the confirmation screen illustrated in FIG. 8 in step S904, the manager 208 can additionally determine whether to display the confirmation screen.

A "notify only when used capacity is large" checkbox 1001 is an option displayed only in a case where the used capacity 603 of the web application is equal to or larger than a predetermined size, when the confirmation screen illustrated in FIG. 8 is displayed in step S904. In a case where this checkbox 1001 is checked and the web application does not save data of which size is equal to or larger than the predetermined size, the display of the confirmation screen illustrated in FIG. 8 is skipped in step S904. In addition, the processing in step S905 to step S907 is skipped.

A "notify only when allocation capacity is large" checkbox 1002 is an option displayed only in a case where the allocation capacity 602 of the web application is equal to or larger than a predetermined size, when the confirmation screen illustrated in FIG. 8 is displayed in step S904. In a case where this checkbox 1002 is checked and the web application does not require an allocation equal to or larger than the predetermined size, the display of the confirmation screen illustrated in FIG. 8 is skipped in step S904. In addition, the processing in step S905 to step S907 is skipped.

A threshold value (predetermined size), which is a determination criterion for the checkbox 1001 and the checkbox 1002, may be a default value determined by the web browser 201 or a value entered by the user as necessary. For example, in a case where the storage device 416 of the information processing terminal 107 is sufficiently large, and no problem is caused by unnecessarily remained data of the amount of equal to or smaller than a predetermined amount, these options can be selected to reduce the number of notifications to the user.

A "do not notify when site is exceptional site" checkbox 1003 is an option for requesting the user to set in advance a web site for which a notification should be omitted. In a case where the checkbox 1003 is checked, the user is required to enter and specify a web site. For example, the user registers a reliable site, such as a groupware used by the company to which the user belongs, to reduce notifications unnecessary for the user. An add button 1004 and a delete button 1005 are buttons for adding and deleting an exceptional site. For a web site specified as the exceptional site, the display of the confirmation screen illustrated in FIG. 8 is skipped in step S904. In addition, the processing in step S905 to step S907 is skipped.

The OK button 1006 is a button to confirm the settings described above.

According to the first exemplary embodiment, transition to the persistent permission state is managed according to an instruction provided by the user via the confirmation screen illustrated in FIG. 8. With this management method, in a case where the user cannot properly determine whether to save data when the web browser first provides the user with the confirmation screen illustrated in FIG. 8, or in a case where data is once specified as data to be retained and becomes unnecessary later, unnecessary data remains undeleted. According to a second exemplary embodiment, a mechanism taking into account the point above is described.

Figure 11:
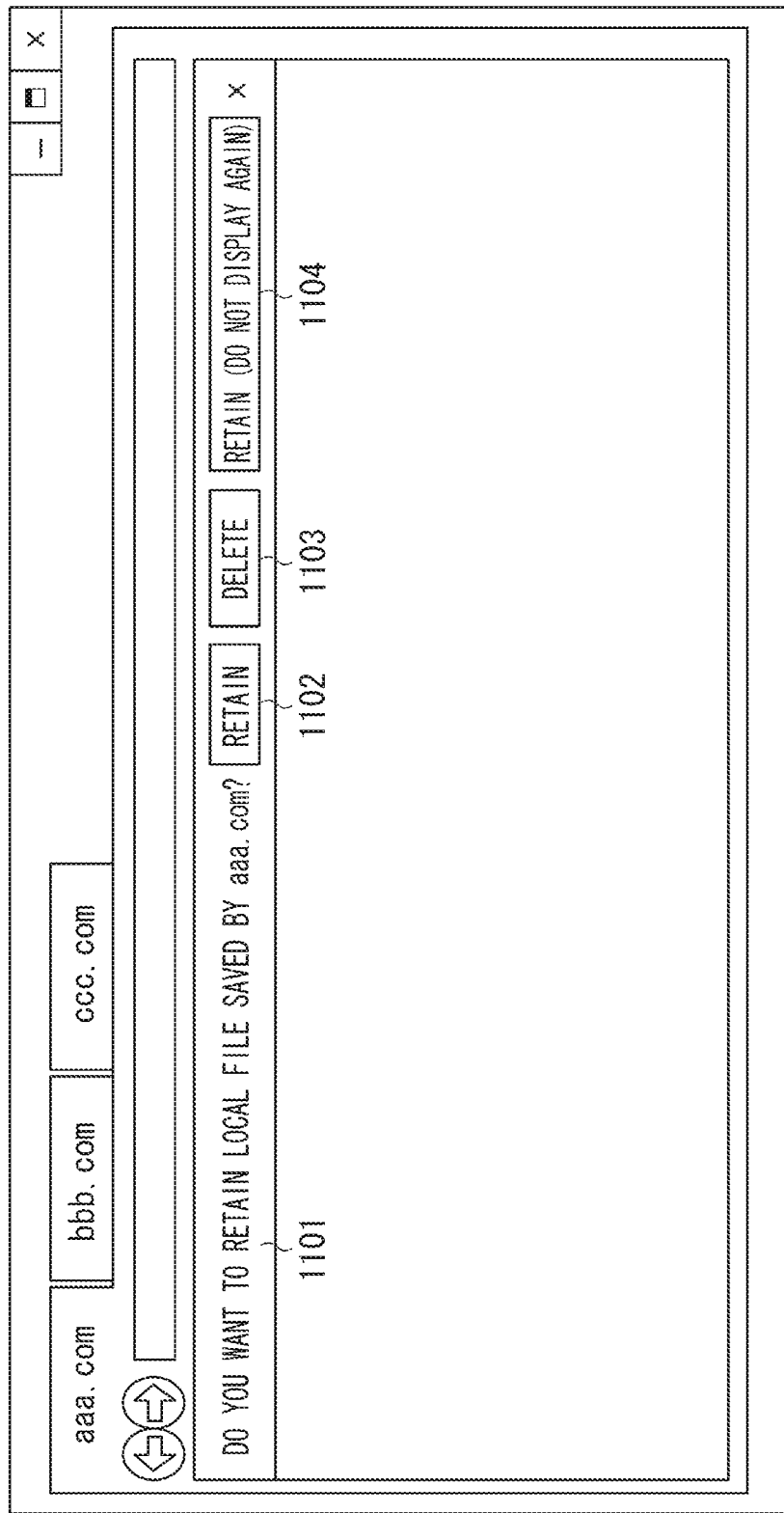
FIG. 11 is a diagram illustrating an example of a confirmation screen for deleting data according to a second exemplary embodiment.
Figure 12:
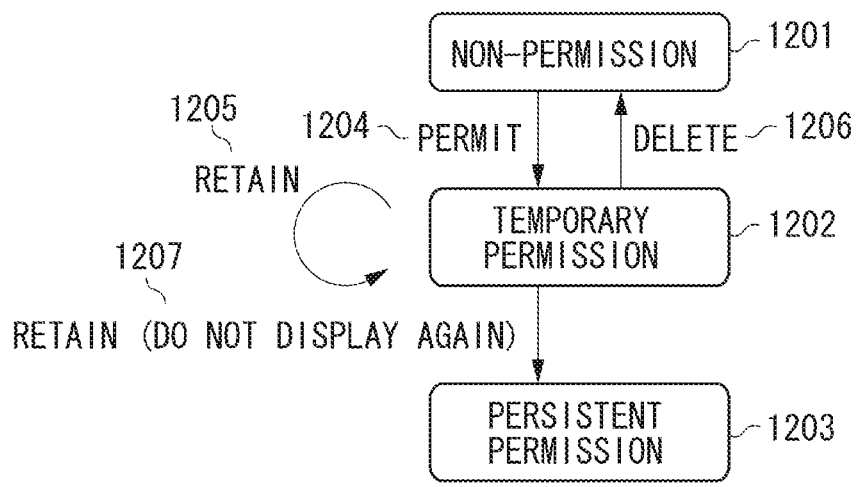
FIG. 12 is a diagram illustrating state transition of a permission state of an application according to the second exemplary embodiment.

FIG. 11 is a diagram illustrating an example of a confirmation screen according to the second exemplary embodiment for confirming the user whether to delete data saved by an application via the data storage 207. FIG. 11 is a modification example of the screen illustrated in FIG. 8. FIG. 12 is a diagram illustrating state transition indicating a permission state of an application according to the second exemplary embodiment.

FIG. 11 is different from FIG. 8 in that a retain button 1102 and a retain (do not display again) button 1104 are separately provided. A message display portion 1101 and a delete button 1103 are similar as those illustrated in FIG. 8.

The retain button 1102 is used by the user to provide an instruction to retain data saved by a web application for the time being. In a case where the retain button 1102 is pressed, the data saved by the application is saved. At the same time, the permission state of the application in the diagram illustrated in FIG. 12 remains in a temporary permission state 1202 via a transition "retain" 1205. In the temporary permission state 1202, the web browser displays the confirmation screen illustrated in FIG. 11 again in step S904 in FIG. 9 according to the first exemplary embodiment. In this case, when the confirmation screen illustrated in FIG. 11 is provided again is at a timing of when the user re-opens a target web site, and after that a movement from the web site is detected. The confirmation screen may also be displayed at a timing of when the manager 208 detects deletion of a target web site from the bookmark or the history of the web browser or at a timing of when the manager 208 detects a web site, which is not accessed for a predetermined time, by a regular inspection.

The retain (do not display again) button 1104 is used by the user to provide an instruction to persistently retain data saved by the web application. When the retain button 1104 is pressed, the data saved by the application of the web site is saved. At the same time, the permission state of the application changes to a persistent permission state 1203 via a transition "retain (do not display again)" 1207 which is for retaining the permission state of the application, as illustrated in FIG. 12.

The meaning of a non-permission state 1201, a transition "permit" 1204, and a transition "delete" 1206 is the same as that for the state and the transition with the same name illustrated in FIG. 7.

For a predetermined time after the retain button 1102 is pressed, the display of the confirmation screen illustrated in FIG. 11 may be suppressed even when the screen should be displayed.

According to the first exemplary embodiment, the confirmation screen illustrated in FIG. 8 for confirming data deletion is displayed at least once even if the user has provided a permission instruction on the confirmation screen illustrated in FIG. 5. On the other hand, this confirmation screen is troublesome to some users. A third exemplary embodiment is provided to improve the point above.

Figure 13:
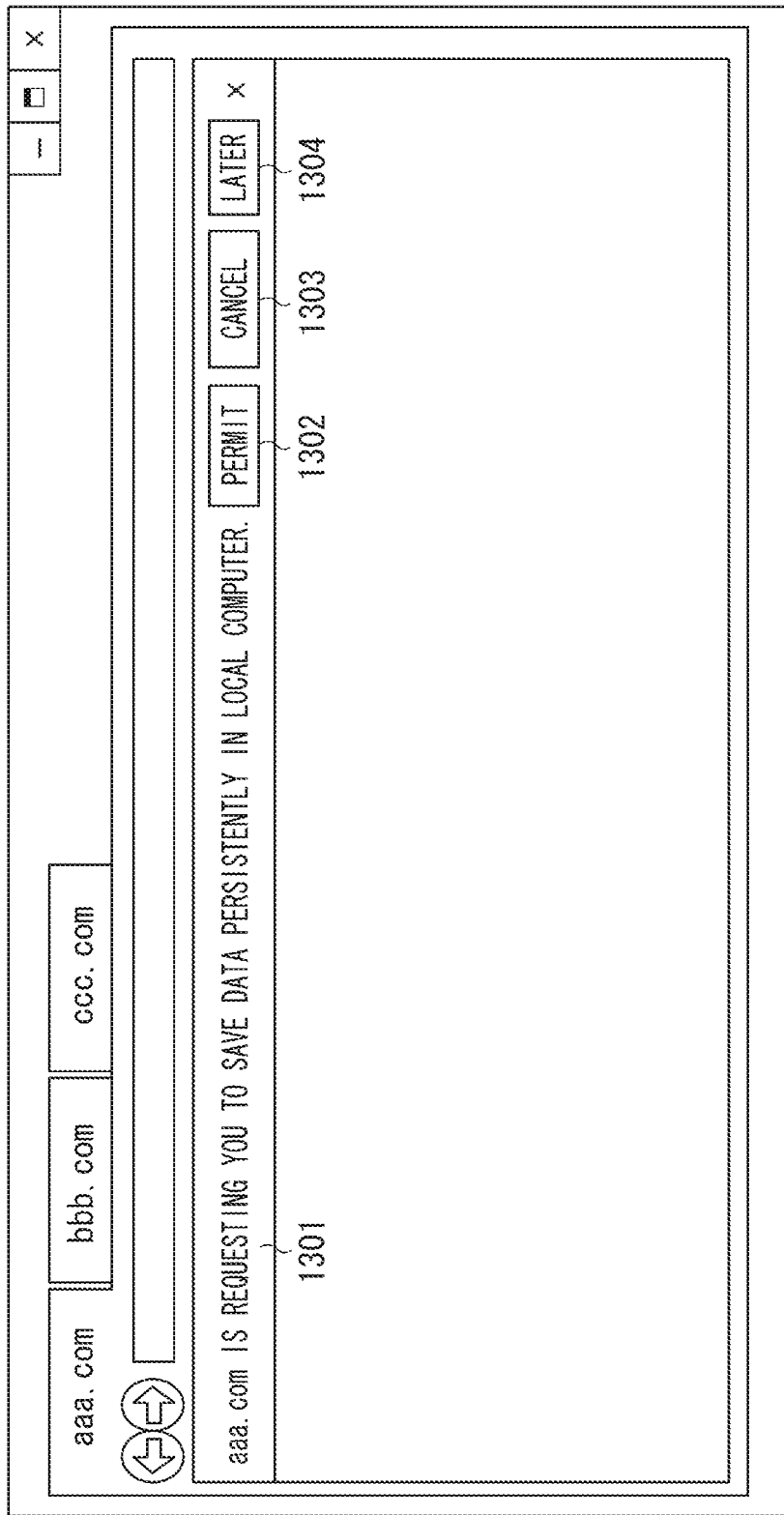
FIG. 13 is a diagram illustrating an example of a confirmation screen on which permission to save data is requested according to a third exemplary embodiment.
Figure 14:
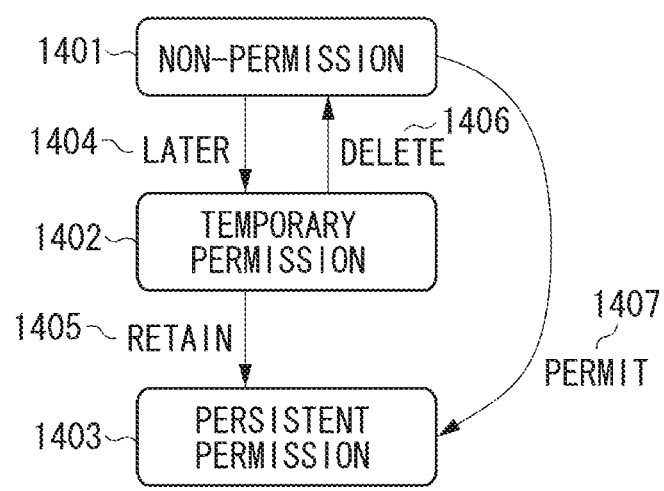
FIG. 14 is a diagram illustrating state transition of a permission state of an application according to the third exemplary embodiment.

FIG. 13 is a diagram illustrating an example of a confirmation screen according to the third exemplary embodiment for requesting the user for permission to save data. FIG. 14 is a diagram illustrating state transition indicating a permission state of an application according to the third exemplary embodiment.

FIG. 13 is different from FIG. 5 in that not only a permit button 1302 but also a later button 1304 is provided. The meaning of a message display portion 1301 and a cancel button 1303 is the same as that for constituents having the same name illustrated in FIG. 5.

The permit button 1302 is used by the user to persistently permit a disk capacity allocation request requested by an application. When the permit button 1302 is pressed, the permission state of the application becomes a persistent permission state 1403 via the transition "permit"" 1407 but not via the temporary permission state 1402.

The later button 1304 is used to temporarily permit a disk capacity allocation request requested by an application, in a case where the user cannot determine whether to permit the request. When the later button 1304 is pressed, the permission state of the application becomes the temporary permission state 1402 via a transition "later" 1404. The meaning of a non-permission state 1401, a transition "retain" 1405, and a transition "delete" 1406 illustrated in FIG. 14 is the same as that for constituents having the same name illustrated in FIG. 7.

In a case where the permission state of the application enters the temporary permission state 1402, the web browser provides the confirmation screen illustrated in FIG. 8 via the processing illustrated in FIG. 9 as described in the above exemplary embodiment.

According to the present exemplary embodiment, the notification of the confirmation screen, which is considered unnecessary, can be suppressed according to an instruction by the user.

The second exemplary embodiment and the third exemplary embodiment may be combined with each other.

In addition, the operation may be switched to any of the operations according to the first to third exemplary embodiments, based on the information processing terminal 107 on which the web browser 201 operates. For example, the capacity of the storage device of a terminal on which the web browser 201 operates is determined and, based on this determination, the operation is switched in such a way that the second exemplary embodiment is used when the capacity of the terminal is small and the third exemplary embodiment is used when the capacity of the terminal is large.

The operation may also be switched to any of the operations according to the first to third exemplary embodiments, based on a user setting. The operation switching may be set on a setting screen (not illustrated) of the web browser 201 or may be set according to a profile of the user.

It is to be understood that the present invention includes a device, a system, and a method that are configured by combining the exemplary embodiments described above.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-125736, filed Jun. 18, 2014, which is hereby incorporated by reference herein in its entirety.

What is claimed is:

1. An information processing terminal comprising:
   a memory storing instructions for operation of a web browser, the web browser having a function to save data relating to a web site into a storage area of the information processing terminal for the web browser; and
   a processor which is capable of executing the instructions causing the information processing terminal to:
   control display of a first confirmation screen, the first confirmation screen being for confirming whether to permit securing of an area of a particular size for saving data therein, according to a request from the web site;
   secure, in a case where permitting is confirmed via the first confirmation screen, the area of the particular size using a FileSystem Application Programming Interface (API) supported by the web browser;
   save the data relating to the web site into the secured area, wherein the saved data in the area secured using the FileSystem API is different from cookie data, WebStorage data and IndexedDataBase (indexedDB) data;
   detect a movement from the web site on the web browser;
   control, on the web browser, display of a second confirmation screen for confirming whether to delete the data relating to the web site, in a case where a movement from the web site is detected;
   delete, in a case where deleting is confirmed via the second confirmation screen, data which has been saved for the web site into the area secured using the FileSystem API, wherein the deleted data is data for which a persistent type is specified as a storage type; and release the secured area for the web site,
   wherein at least in one of cases where a uniform resource locator (URL) of a web site different from the web site is specified, where a tab of the web site is closed on the web browser, and where the web browser is closed, a movement from the web site is detected.

2. The information processing terminal according to claim 1, wherein the instructions further cause the information processing terminal to, in a case where deleting is confirmed via the second confirmation screen, delete at least a part of data among other data relating to the web site in addition to the data which has been saved for the web site into the area secured using the FileSystemAPI and for which the persistent type is specified, and
   wherein the other data relating to the web site includes data for which a temporary type is specified as the storage type, WebStorage data, and IndexedDataBase (indexedDB) data.

3. The information processing terminal according to claim 1, wherein in a case where a bookmark corresponding to the web site is deleted on the web browser or in a case where it is detected that the web site is not accessed for a predetermined time, the second confirmation screen is displayed.

4. The information processing terminal according to claim 1, wherein, in a case where not deleting is confirmed via the second confirmation screen, the first confirmation screen is not displayed even when the web site is opened later.

5. The information processing terminal according to claim 1, wherein in a case where the particular size is smaller than a threshold value, the second confirmation screen is not displayed.

6. The information processing terminal according to claim 1, wherein in a case where a size of data relating to the web site to be saved is smaller than a threshold value, the second confirmation screen is not displayed.

7. The information processing terminal according to claim 1, wherein in a case where the web site is specified as an exceptional site, the second confirmation screen is not displayed.

8. The information processing terminal according to claim 1,
   wherein
   in a case where it is confirmed via the first confirmation screen that saving of the data relating to the web site is persistently permitted, the second confirmation screen is not displayed even when a movement from the web site is detected, and
   in a case where it is confirmed via the first confirmation screen that the saving of the data relating to the web site is temporarily permitted, display of the second confirmation screen is controlled when a movement from the web site is detected.

9. A method for a web browser having a function to save data relating to a web site into a storage area for the web browser in an information processing terminal, the method comprising:
   first controlling display of a first confirmation screen, the first confirmation screen being for confirming whether to permit securing of an area of a particular size for saving data therein, according to a request from the web site;
   securing, in a case where permitting is confirmed via the first confirmation screen, the area of the particular size using a FileSystem Application Programming Interface (API) supported by the web browser;
   saving the data relating to the web site into the secured area, wherein the saved data in the area secured using the FileSystem API is different from cookie data, WebStorage data and IndexedDataBase (indexedDB) data;
   detecting a movement from the web site on the web browser;
   second controlling, on the web browser, display of a second confirmation screen for confirming whether to delete the data relating to the web site, in a case where a movement from the web site is detected;
   deleting, in a case where deleting is confirmed via the second confirmation screen, data which has been saved for the web site into the area secured using the File-System API, wherein the deleted data is data for which a persistent type is specified as a storage type; and releasing the secured area for the web sit, wherein at least in one of cases where a uniform resource locator (URL) of a web site different from the web site is specified, where a tab of the web site is closed on the web browser, and where the web browser is closed, a movement from the web site is detected.

10. A non-transitory computer readable storage medium on which is stored a computer program for making a computer execute a method for a web browser having a function to save data relating to a web site into a storage area for the web browser in an information processing terminal, the method comprising:

first controlling display of a first confirmation screen, the first confirmation screen being for confirming whether to permit securing of an area of a particular size for saving data therein, according to a request from the web site;

securing, in a case where permitting is confirmed via the first confirmation screen, the area of the particular size using a FileSystem Application Programming Interface (API) supported by the web browser;

saving the data relating to the web site into the secured area, wherein the saved data in the area secured using the FileSystem API is different from cookie data, WebStorage data and IndexedDataBase (indexedDB) data;

detecting a movement from the web site on the web browser;

second controlling, on the web browser, display of a second confirmation screen for confirming whether to delete the data relating to the web site, in a case where a movement from the web site is detected;

deleting, in a case where deleting is confirmed via the second confirmation screen, data which has been saved for the web site into the area secured using the File-System API, wherein the deleted data is data for which a persistent type is specified as a storage type; and releasing the secured area for the web site, wherein at least in one of cases where a uniform resource locator (URL) of a web site different from the web site is specified, where a tab of the web site is closed on the web browser, and where the web browser is closed, a movement from the web site is detected.

11. The information processing terminal according to claim 1, wherein the instructions further cause the information processing terminal to, in a case where deleting is confirmed via the second confirmation screen, delete cookie data relating to the web site in addition to the data which has been saved for the web site into the area secured using the File System API and for which the persistent type is specified.

\* \* \* \* \*